United States Patent
Lee et al.

(10) Patent No.: US 11,800,081 B2
(45) Date of Patent: Oct. 24, 2023

(54) CAMERA MODULE AND DEPTH INFORMATION OBTAINING METHOD THEREFORE

(71) Applicant: LG INNOTEK CO., LTD., Seoul (KR)

(72) Inventors: Chang Hyuck Lee, Seoul (KR); Eun Song Kim, Seoul (KR); Ji Hyouk Chung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/973,263

(22) PCT Filed: Jun. 7, 2019

(86) PCT No.: PCT/KR2019/006899
§ 371 (c)(1),
(2) Date: Dec. 8, 2020

(87) PCT Pub. No.: WO2019/235889
PCT Pub. Date: Dec. 12, 2019

(65) Prior Publication Data
US 2021/0250535 A1    Aug. 12, 2021

(30) Foreign Application Priority Data

Jun. 8, 2018    (KR) .................... 10-2018-0066202

(51) Int. Cl.
*H04N 13/296*    (2018.01)
*H04N 5/222*     (2006.01)
(Continued)

(52) U.S. Cl.
CPC ......... *H04N 13/296* (2018.05); *H04N 5/2226* (2013.01); *H04N 13/207* (2018.05);
(Continued)

(58) Field of Classification Search
CPC .. H04N 13/207; H04N 13/214; H04N 13/236; H04N 13/254; H04N 13/296; H04N 13/211; H04N 19/59; H04N 25/44
See application file for complete search history.

(56) References Cited

U.S. PATENT DOCUMENTS 9,325,973 B1    4/2016   Hazeghi et al.
9,578,218 B2    2/2017   Topliss
(Continued)

FOREIGN PATENT DOCUMENTS

KR        10-1629610 B1      6/2016
KR        10-2016-0090464 A   8/2016
WO        WO 2017/149092 A2   9/2017

OTHER PUBLICATIONS

Chinese Office Action and Search Report for corresponding Chinese Application No. 201980039044.6. dated Jun. 1, 2023.

*Primary Examiner* — David N Werner
(74) *Attorney, Agent, or Firm* — Birch, Stewart, Kolasch & Birch, LLP (57) ABSTRACT

A camera module including a lighting unit configured to output an incident light signal to be emitted to an object, a lens unit configured to concentrate a reflected light signal reflected from the object, an image sensor unit configured to generate electric signals from the reflected light signal concentrated by the lens unit, a tilting unit configured to shift an optical path of at least one of the incident light signal and the reflected light signal for each image frame in units of subpixels of the image sensor unit, and an image control unit configured to extract depth information of the object using a phase difference between the incident light signal and the reflected light signal. The image control unit includes an image controller configured to extract the depth information
(Continued)

having a higher resolution than a plurality of subframes generated using the electric signals on the basis of the subframes.

10 Claims, 6 Drawing Sheets

(51) Int. Cl.
| | |
|---|---|
| H04N 13/207 | (2018.01) |
| H04N 13/254 | (2018.01) |
| H04N 13/214 | (2018.01) |
| H04N 13/236 | (2018.01) |
| H04N 13/271 | (2018.01) |
| H04N 23/56 | (2023.01) |
| H04N 13/211 | (2018.01) |
| H04N 25/705 | (2023.01) |
| H04N 25/44 | (2023.01) |
| H04N 19/59 | (2014.01) |

(52) U.S. Cl.
CPC ......... *H04N 13/211* (2018.05); *H04N 13/214* (2018.05); *H04N 13/236* (2018.05); *H04N 13/254* (2018.05); *H04N 13/271* (2018.05); *H04N 23/56* (2023.01); *H04N 19/59* (2014.11); *H04N 25/44* (2023.01); *H04N 25/705* (2023.01)

(56) References Cited

U.S. PATENT DOCUMENTS

| | | | | |
|---|---|---|---|---|
| 2002/0139920 | A1* | 10/2002 | Seibel | H04N 5/2256 250/208.1 |
| 2010/0177164 | A1* | 7/2010 | Zalevsky | H04N 13/20 348/46 |
| 2013/0135449 | A1* | 5/2013 | Horii | H04N 13/225 348/49 |
| 2013/0314500 | A1* | 11/2013 | Aoki | H04N 13/296 348/46 |
| 2014/0168387 | A1* | 6/2014 | Aoki | H04N 25/704 348/49 |
| 2014/0285629 | A1* | 9/2014 | Okigawa | H04N 9/04515 348/46 |
| 2016/0212332 | A1 | 7/2016 | Tang et al. | |
| 2016/0301915 | A1* | 10/2016 | Shechtman | G02B 26/06 |
| 2019/0011809 | A1* | 1/2019 | Wippermann | H04N 5/2258 |
| 2020/0359004 | A1* | 11/2020 | Saari | H04N 13/271 |
| 2021/0166408 | A1* | 6/2021 | Kim | H04N 5/2256 |
| 2021/0235059 | A1* | 7/2021 | Kim | H04N 13/271 |

* cited by examiner

CAMERA MODULE AND DEPTH INFORMATION OBTAINING METHOD THEREFORE

CROSS REFERENCE TO RELATED APPLICATIONS

This application is the National Phase of PCT International Application No. PCT/KR2019/006899, filed on Jun. 7, 2019, which claims priority under 35 U.S.C. 119(a) to Patent Application No. 10-2018-0066202, filed in the Republic of Korea on Jun. 8, 2018, all of which are hereby expressly incorporated by reference into the present application.

TECHNICAL FIELD

The present invention relates to a camera module and a method of extracting depth information for the same.

BACKGROUND ART

Three-dimensional content applies to many fields including not only games and culture but also education, manufacturing, autonomous driving. etc., and a depth map is necessary to acquire three-dimensional content. Depth information is information indicating spatial distance which represents perspective information of one point in a two-dimensional image with respect to another point.

According to one method of acquiring depth information, infrared (IR) structured light is projected onto an object, and light reflected from the object is interpreted to extract depth information. The method employing IR structured light has a problem in that it is difficult to obtain a desired level of depth resolution for a moving object.

Meanwhile, as a technology that replaces the method employing IR structured light, the time of flight (TOF) method is attracting attention.

According to the TOF method, a distance from an object is calculated by measuring a flight time, i.e., a time taken for emitted light to be reflected. The greatest merit of the TOF method is that distance information is rapidly provided regarding three-dimensional space in real time. Also, a user can obtain accurate distance information without additionally applying an algorithm or making a hardware correction. Further, even when a very close object or a moving object is measured, it is possible to acquire accurate depth information.

However, the current TOF method has a problem in that the amount of information obtained from each frame, that is, resolution, is very small.

To increase the resolution, the number of pixels in an image sensor may be increased. In this case, however, the volume and manufacturing cost of the camera module are significantly increased.

Accordingly, there is a need for a depth information acquisition method for increasing the resolution without increasing the volume and manufacturing cost of a camera module.

DISCLOSURE

Technical Problem

The present invention is directed to providing a camera module for extracting depth information using the time of flight (TOF) method and a depth information extraction method thereof.

One aspect of the present invention provides a camera module including a lighting unit configured to output an incident light signal to be emitted to an object, a lens unit configured to concentrate a reflected light signal reflected from the object, an image sensor unit configured to generate electric signals from the reflected light signal concentrated by the lens unit, a tilting unit configured to shift an optical path of at least one of the incident light signal and the reflected light signal for each image frame in units of subpixels of the image sensor unit, and an image control unit configured to extract depth information of the object using a phase difference between the incident light signal and the reflected light signal. The image control unit includes an image controller configured to extract the depth information having a higher resolution than a plurality of subframes generated using the electric signals on the basis of the subframes.

The image control unit may generate high-resolution subframes having a higher resolution than the plurality of subframes, which correspond to reference signals having the same phase and have different optical paths, by rearranging pixel values of the plurality of subframes.

The image control unit may generate a plurality of high-resolution subframes corresponding to reference signals having different phases and extract the depth information using the plurality of high-resolution subframes.

The image control unit may rearrange the pixel values of the plurality of subframes in a high-resolution pixel grid according to a direction in which the optical path is shifted on the basis of a subframe of which an optical path is identical to a preset reference path among the plurality of subframes.

The image control unit may rearrange the pixel values of the plurality of subframes in the high-resolution pixel grid by applying weights to the pixel values of the plurality of subframes.

The weights may be set differently depending on a size of the subpixels or the direction in which the optical path is shifted.

The image control unit may generate low-resolution depth information having the same resolution as the plurality of subframes, which correspond to reference signals having the same phase and have the same optical path, on the basis of the plurality of subframes.

The image control unit may generate a plurality of pieces of low-resolution depth information corresponding to different optical paths and extract the depth information using the plurality of pieces of low-resolution depth information.

The image control unit may rearrange pixel values of the plurality of pieces of low-resolution depth information in a high-resolution pixel grid according to a direction in which the optical path is shifted on the basis of low-resolution depth information corresponding to an optical path identical to a preset reference path among the plurality of pieces of low-resolution depth information.

The image control unit may rearrange the pixel values of the plurality of pieces of low-resolution depth information in the high-resolution pixel grid by applying weights to the pixel values of the plurality of pieces of low-resolution depth information.

Advantageous Effects

When a camera module according to one embodiment of the present invention is used, it is possible to acquire high-resolution depth information without significantly increasing the number of pixels of an image sensor.

It is possible to increase the resolution of a depth map with only the amount of computation which is as large as that used for data reforming.

MODES OF THE INVENTION

Hereinafter, exemplary embodiments of the present invention will be described in detail with reference to the accompanying drawings.

However, the technical spirit of the present invention is not limited to some embodiments which will be described and may be embodied in various forms, and one or more elements in the embodiments may be selectively combined or replaced to be used within the scope of the technical spirit of the present invention.

Further, terms used in the embodiments of the present invention (including technical and scientific terms) may be interpreted with meanings which are generally understood by those of ordinary skill in the art unless particularly defined and described, and generally used terms, such as terms defined in a dictionary, may be understood in consideration of their contextual meanings in the related art.

Also, terms used in the embodiments are provided not to limit the present invention but to describe the embodiments.

In the specification, the singular form may also include the plural form unless the context clearly indicates otherwise, and "at least one (or one or more) of A, B, and C" may include one or more of all possible combinations of A, B, and C.

In addition, terms, such as first, second, A, B, (a), and (b), may be used to describe elements of the embodiments of the present invention.

The terms are only provided to distinguish the elements from other elements, and the essence, sequence, order, or the like of the elements are not limited thereto.

When an element is stated as being "connected," "coupled," or "linked" to another element, the element may be not only directly connected, coupled, or linked to the other element but also "connected," "coupled," or "linked" to the other element through still another element between the element and the other element.

Also, when an element is stated as being disposed "on or under" another element, the two elements may be in direct contact with each other, and also one or more other elements may be formed or disposed between the two elements.

Further, the term "on or under" may indicate not only an upward direction but also a downward direction from one element.

Figure 1:
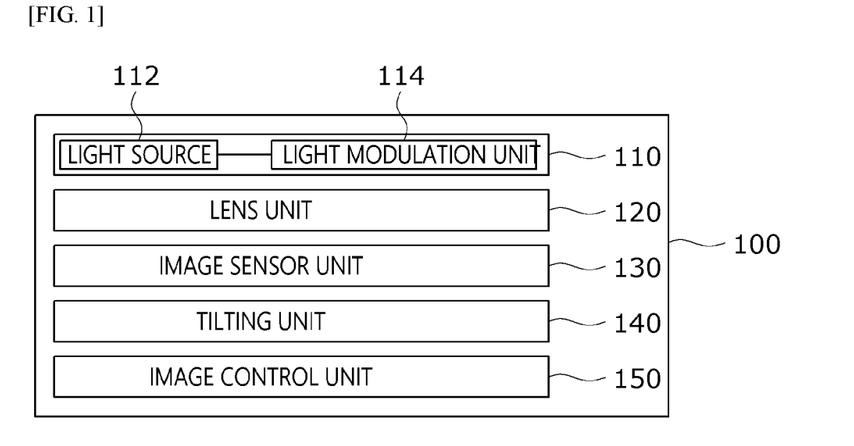
FIG. 1 is a block diagram of a camera module according to one embodiment of the present invention.

FIG. 1 is a block diagram of a camera module according to one embodiment of the present invention.

Referring to FIG. 1, a camera module 100 includes a lighting unit 110, a lens unit 120, an image sensor unit 130, a tilting unit 140, and an image control unit 150.

The lighting unit 110 generates an incident light signal and then emits the incident light signal to an object. In this case, the lighting unit 110 may generate and output the incident light signal in the form of a pulse wave or a continuous wave. The continuous wave may be a sinusoid wave or a squared wave. Since the incident light signal is generated in the form of a pulse wave or a continuous wave, the camera module 100 may detect a phase difference between the incident light signal output from the lighting unit 110 and a reflected light signal which is reflected from the object. In this specification, incident light may refer to light which is output from the lighting unit 110 and incident on an object, and reflected light may refer to light which is output from the lighting unit 110, incident on an object, and then reflected from the object. From the viewpoint of the camera module 100, incident light may be output light, and reflected light may be input light.

The lighting unit 110 emits the generated incident light signal to the object during a set integration time. An integration time means one frame period. When a plurality of frames are generated, the set integration time is repeated. For example, when the camera module 100 images the object at 20 frames per second (FPS), the integration time is 1/20 seconds. Also, when 100 frames are generated, the integration time may be repeated 100 times.

The lighting unit 110 may generate a plurality of incident light signals having different frequencies. The lighting unit 110 may generate a plurality of incident light signals having different frequencies sequentially and repeatedly. Alternatively, the lighting unit 110 may simultaneously generate a plurality of incident light signals having different frequencies.

Figure 2:
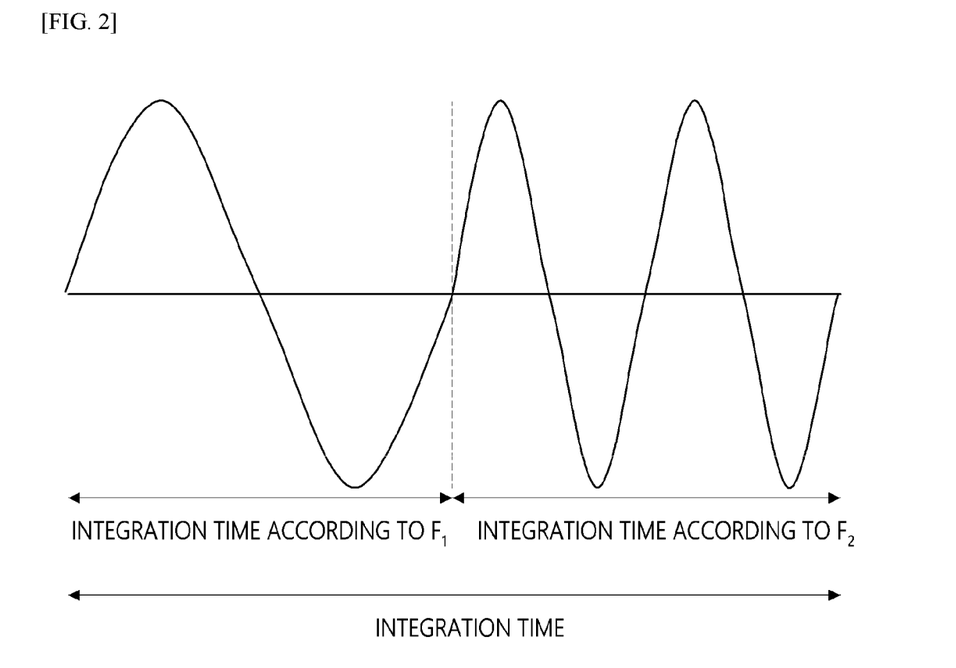
FIG. 2 is a diagram illustrating the frequency of an incident light signal.

FIG. 2 is a diagram illustrating the frequency of an incident light signal. According to an embodiment of the present invention, as shown in FIG. 2, the lighting unit 110 may be controlled to generate an incident light signal having a frequency of $f_1$ during a first half of an integration time and may be controlled to generate an incident light signal having a frequency of $f_2$ during the remaining half of the integration time.

According to another embodiment of the present invention, the lighting unit 110 may control some of a plurality of light-emitting diodes (LEDs) to generate an incident light signal having a frequency of $f_1$ and control remaining LEDs to generate an incident light signal having a frequency of $f_2$.

To this end, the lighting unit 110 may include a light source 112 which generates light and a light modulation unit 114 which modulates the light.

First, the light source 112 generates light. The light generated by the light source 112 may be infrared light having a wavelength of 770 nm to 300 nm or visible light having a wavelength of 380 nm to 770 nm. The light source 112 may employ LEDs, and a plurality of LEDs may be arranged in a predetermined pattern. In addition, the light source 112 may include organic LEDs (OLEDs) or laser diodes (LDs).

The light source 112 generates an incident light signal in the form of a pulse wave or a continuous wave by repeatedly being turned on and off at predetermined time intervals. The predetermined time intervals may be the frequency of an incident light signal. Turning the light source on and off may be controlled by the light modulation unit 114.

The light modulation unit 114 controls turning the light source 112 on and off so that the light source 112 may generate an incident light signal in the form of a pulse wave. The light modulation unit 114 may control the light source 112 through frequency modulation, pulse modulation, or the like to generate an incident light signal in the form of a continuous wave or a pulse wave.

Meanwhile, the lens unit 120 concentrates the reflected light signal reflected from the object and transmits the concentrated light signal to the image sensor unit 130.

Figure 3:
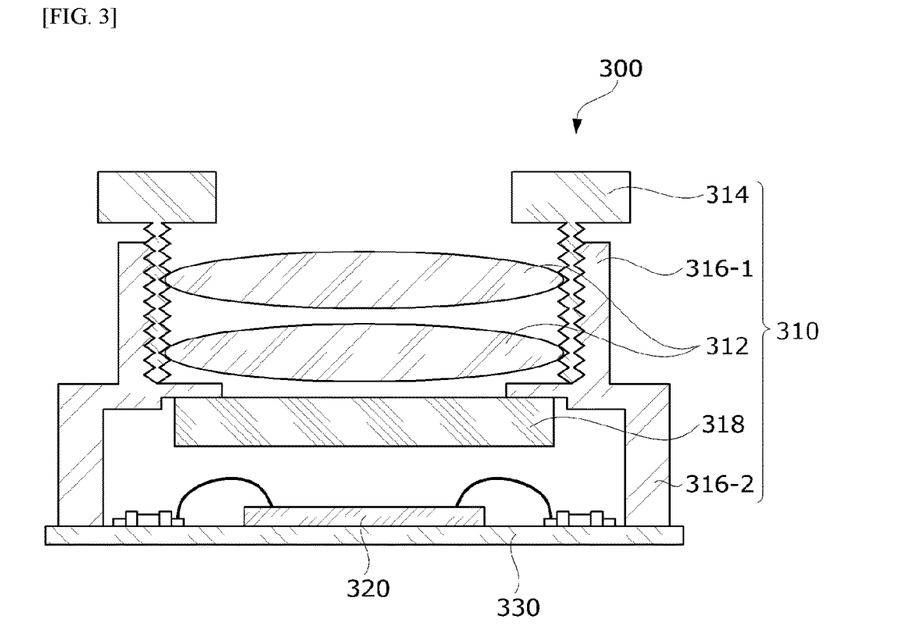
FIG. 3 is an example of a cross-sectional view of a camera module.

FIG. 3 is an example of a cross-sectional view of a camera module.

Referring to FIG. 3, a camera module 300 includes a lens assembly 310, an image sensor 320, and a printed circuit board 330. The lens assembly 310 may correspond to the lens unit 120 of FIG. 1, and the image sensor 320 may correspond to the image sensor unit 130 of FIG. 1. Also, the image control unit 150 and the like of FIG. 1 may be implemented in the printed circuit board 330. Although not shown in the drawing, the lighting unit 110 of FIG. 1 may be disposed on a side surface of the image sensor 320 on the printed circuit board 330.

The lens assembly 310 may include a lens 312, a lens barrel 314, a lens holder 316, and an infrared (IR) filter 318.

The lens 312 may include a plurality of lenses or one lens. When the lens 312 includes a plurality of lenses, the lenses may be aligned on the basis of central axes thereof to form an optical system. The central axes may be the same as the optical axis of the optical system.

The lens barrel 314 may be coupled to the lens holder 316 and may have a space in which lenses may be accommodated therein. One or more lenses may be coupled to the lens barrel 314 in a rotary manner. However, this is exemplary, and one or more lenses may be coupled to the lens barrel 314 in another way such as with adhesive (e.g., an adhesive resin such as epoxy).

The lens holder 316 may be coupled to the lens barrel 314 to support the lens barrel 314 and coupled to the printed circuit board 330 on which the image sensor 320 is mounted. The lens holder 316 may have a space, in which the IR filter 318 may be attached, under the lens barrel 314. A spiral pattern may be formed on the inner circumferential surface of the lens holder 316 and coupled to the lens barrel 314 having an outer circumferential surface, on which a spiral pattern is similarly formed, in a rotary manner. However, this is exemplary, and the lens holder 316 and the lens barrel 314 may be coupled through an adhesive, or the lens holder 316 and the lens barrel 314 may be integrally formed.

The lens holder 316 may be divided into an upper holder 316-1 coupled to the lens barrel 314 and a lower holder 316-2 coupled to the printed circuit board 330 on which the image sensor 320 is mounted. The upper holder 316-1 and the lower holder 316-2 may be integrally formed or may be formed as separate structures and then combined or coupled together. Here, the upper holder 316-1 may be formed to have a smaller diameter than the lower holder 316-2. In this specification, the term "housing" may be interchangeably used with the lens holder 316.

The above example is only an embodiment, and the lens unit 120 may be configured in another structure for concentrating and transmitting a reflected light signal, which is incident on the time of flight (TOF) camera module 100, to the image sensor unit 130.

Referring back to FIG. 1, the image sensor unit 130 generates an electric signal using the reflected light signal concentrated through the lens unit 120.

The image sensor unit 130 may absorb the reflected light signal in synchronization with the on-off cycle of the lighting unit 110. Specifically, the image sensor unit 130 may absorb light in phase and out phase with the incident light signal output from the lighting unit 110. In other words, the image sensor unit 130 may repeatedly perform a step of absorbing the reflected light signal while the light source is turned on and a step of absorbing the reflected light signal while the light source is turned off.

Next, the image sensor unit 130 may generate an electric signal corresponding to each reference signal using a plurality of reference signals having different phase differences. The frequencies of the reference signals may be set to be identical to the frequency of the incident light signal output from the lighting unit 110. Accordingly, when the lighting unit 110 generates incident light signals at a plurality of frequencies, the image sensor unit 130 generates electric signals using a plurality of reference signals corresponding to frequencies. The electric signal may include information on the amount of charge or a voltage corresponding to each reference signal.

Figure 4:
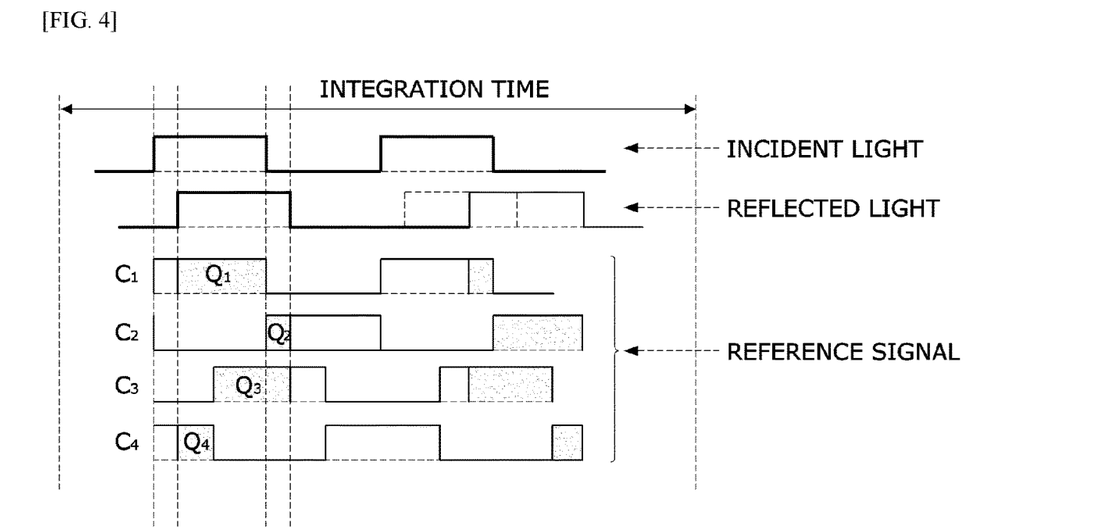
FIG. 4 is a timing diagram illustrating an electric signal generation process according to an embodiment of the present invention.

FIG. 4 is a timing diagram illustrating an electric signal generation process according to an embodiment of the present invention.

As shown in FIG. 4, there may be four reference signals $C_1$ to $C_4$ according to the embodiment of the present invention. The reference signals $C_1$ to $C_4$ may have the same frequency as the incident light signal and a phase difference of 90 degrees with each other. One reference signal $C_1$ among the four reference signals $C_1$ to $C_4$ may have the same phase as the incident light signal. The phase of the reflected light signal is delayed by as much as the distance over which the incident light signal is incident on and reflected from the object and then returns. The image sensor unit 130 mixes the reflected signal with each of the reference signals. Then, the image sensor unit 130 may generate electric signals corresponding to the shaded portions of FIG. 4 depending on the reference signals.

In another embodiment, when incident light signals are generated at a plurality of frequencies during an integration time, the image sensor unit 130 absorbs reflected light signals according to the plurality of frequencies. For example, it is assumed that incident light signals are generated at frequencies of $f_1$ and $f_2$ and a plurality of reference signals have a phase difference of 90 degrees. Then, reflected light signals also have frequencies of $f_1$ and $f_2$, and thus four electric signals may be generated from the reflected light signal having a frequency of $f_1$ and four reference signals corresponding to the reflected light signal. Also, four electric signals may be generated from the reflected light signal having a frequency of $f_2$ and four reference signals corresponding to the reflected light signal. Accordingly, a total of eight electric signals may be generated.

The image sensor unit 130 may be configured in a structure in which a plurality of pixels are arranged in a grid form. The image sensor unit 130 may be a complementary metal oxide semiconductor (CMOS) image sensor or a charge-coupled device (CCD) image sensor.

For example, when the image sensor unit 130 has a resolution of 320×240, 76,800 pixels are arranged in a grid form. In this case, a predetermined interval may be formed between the plurality of pixels. In embodiments of the present invention, one pixel is described as including the predetermined interval adjacent thereto.

According to an embodiment of the present invention, each pixel may include a first light-receiving unit including a first photodiode and a first transistor and a second light-receiving unit including a second photodiode and a second transistor.

The first light-receiving unit receives a reflected light signal in a phase identical to that of incident light. In other words, while a light source is turned on, the first photodiode is turned on and absorbs a reflected light signal. While the light source is turned off, the first photodiode is turned off and stops absorbing a reflected light signal. The first photodiode converts the absorbed reflected light signal into a current and transfers the current to the first transistor. The first transistor converts the received current into an electric signal and outputs the electric signal.

The second light-receiving unit receives a reflected light signal in a phase opposite to that of incident light. In other words, while a light source is turned on, the second photodiode is turned off and absorbs a reflected light signal. While the light source is turned off, the second photodiode is turned on and stops absorbing a reflected light signal. The second photodiode converts the absorbed reflected light signal into a current and transfers the current to the second transistor. The second transistor converts the received current into an electric signal.

Accordingly, the first light-receiving unit may be referred to as an in-phase receiving unit, and the second light-receiving unit may be referred to as an out-phase receiving unit. As such, when the first light-receiving unit and the second light-receiving unit are activated over time, the amount of received light varies according to the distance from an object. As an example, when the object is immediately in front of the camera module 100 (i.e., when the distance equals zero), the time taken for light output from the lighting unit 110 to be reflected and return from the object is zero, and thus the on-off cycle of the light source becomes a light receiving cycle. Accordingly, only the first light-receiving unit receives light, and the second light-receiving unit does not receive light. As another example, when the object is spaced a predetermined distance from the camera module 100, it takes time for light output from the lighting unit 110 to be reflected and return from the object, and thus the on-off cycle of the light source differs from a light receiving cycle. Accordingly, there is a difference between the amount of light received by the first light-receiving unit and the amount of light received by the second light-receiving unit. In other words, the distance from the object may be calculated using the difference between the amount of light received by the first light-receiving unit and the amount of light received by the second light-receiving unit. Referring back to FIG. 1, the image control unit 150 calculates a phase difference between incident light and reflected light using an electric signal received from the image sensor unit 130 and calculates the distance between an object and the camera module 100 using the phase difference.

Specifically, the image control unit 150 may calculate the phase difference between the incident light and the reflected light using information on the charge amount of the electric signal.

As described above, four electric signals may be generated for each frequency of an incident light signal. Accordingly, the image control unit 150 may calculate a phase difference to between the incident light signal and the reflected light signal using Equation 1 below.

$$t_d = \arctan\left(\frac{Q_3 - Q_4}{Q_1 - Q_2}\right) \qquad \text{[Equation 1]}$$

Here, $Q_1$ to $Q_4$ are the charge amounts of four electric signals. $Q_1$ is the charge amount of an electric signal corresponding to a reference signal having the same phase as the incident light signal. $Q_2$ is the charge amount of an electric signal corresponding to a reference signal of which a phase is delayed by 180 degrees more than the incident light signal. $Q_3$ is the charge amount of an electric signal corresponding to a reference signal of which a phase is delayed by 90 degrees more than the incident light signal. $Q_4$ is the charge amount of an electric signal corresponding to a reference signal of which a phase is delayed by 270 degrees more than the incident light signal.

Then, the image control unit 150 may calculate the distance between the object and the camera module 100 using the incident light signal and the reflected light signal. Here, the image control unit 150 may calculate the distance d between the object and the TOF camera module 100 using Equation 2 below.

$$d = \frac{c}{2f} \frac{t_d}{2\pi} \qquad \text{[Equation 2]}$$

Here, c is the speed of light, and f is the frequency of incident light.

Meanwhile, a super resolution (SR) technique may be used to increase the resolution of depth information. The SR technique is a technique for obtaining a high-resolution image from a plurality of low-resolution images. The mathematical model of the SR technique may be represented by Equation 3.

$$y_k = D_k B_k M_k x + n_k \qquad \text{[Equation 3]}$$

Here, $1 \le k \le p$, p is the number of low-resolution images, $y_k$ is a low-resolution image ($=[y_{k,1}, y_{k,2}, \ldots, y_{k,M}]^T$ where $M=N_1*N_2$), $D_k$ is a down-sampling matrix, $B_k$ is an optical blur matrix, $y_k$, $M_k$ is an image warping matrix, x is a high-resolution image ($=[x_1, x_2, \ldots, x_N]^T$ where $N=L_1 N_1 * L_2 N_2$), and $n_k$ is noise. In other words, according to the SR technique, x is estimated by applying an estimated inverse function of resolution degrading elements to $y_k$. The SR technique may be roughly classified into a statistical method or a multi-frame method, and the multi-frame method may be roughly classified into a space division method and a time division method. When the SR technique is used to acquire depth information, there is no inverse function of $M_k$ of Equation 1, and thus the statistical method may be attempted. However, the statistical method requires a repetitive computation process and thus has a problem of low efficiency.

In an embodiment of the present invention, an SR technique for generating a high-resolution image by rearranging pixel values of a plurality of low-resolution images according to the embodiment of the present invention, unlike an existing SR technique for generating a high-resolution image by calculating an inverse function, is used.

To apply the SR technique according to the embodiment of the present invention to depth information extraction, the image control unit 150 generates a plurality of low-resolution subframes using electric signals received from the image sensor unit 130 and then extracts a plurality of pieces of low-resolution depth information using the plurality of low-resolution subframes. Then, high-resolution depth information may be extracted by rearranging pixel values of the plurality of pieces of low-resolution depth images.

Here, a subframe refers to an image frame generated from an electric signal which corresponds to any one integration time and reference signal. For example, when electric signals are generated through eight reference signals during a first integration time, that is, one image frame, eight subframes may be generated, and one start of frame may be additionally generated.

Alternatively, to apply the SR technique according to the embodiment of the present invention to depth information extraction, the image control unit 150 generates a plurality of low-resolution subframes using electric signals received from the image sensor unit 130 and then generates a plurality of high-resolution subframes by rearranging pixel values of the plurality of low-resolution subframes. Then, high-resolution depth information may be extracted using the high-resolution subframes.

To this end, a pixel shift technology may be used. In other words, the pixel shift technology is used to acquire several images which are shifted by a subpixel from each subframe, and then a plurality of pieces of high-resolution subframe image data are acquired by applying the SR technique according to the embodiment of the present invention to each subframe. Then, high-resolution depth information may be extracted using the high-resolution subframe image data. For pixel shift, the camera module 100 according to the embodiment of the present invention includes the tilting unit 140.

Referring back to FIG. 1, the tilting unit 140 changes the optical path of at least one of the incident light signal and the reflected light signal in units of subpixels of the image sensor unit 130.

The tilting unit 140 changes the optical path of at least one of the incident light signal and the reflected light signal depending on frames. As described above, one frame may be generated during each integration time. Accordingly, when one integration time ends, the tilting unit 140 changes the optical path of at least one of the incident light signal and the reflected light signal.

The tilting unit 140 changes the optical path of at least one of the incident light signal and the reflected light signal by as much as a unit of subpixels on the basis of the image sensor unit 130. In this case, the tilting unit 140 moves the optical path of at least one of the incident light signal and the reflected light signal in any one of up, down, left, and right directions from the current optical path.

Figure 5:
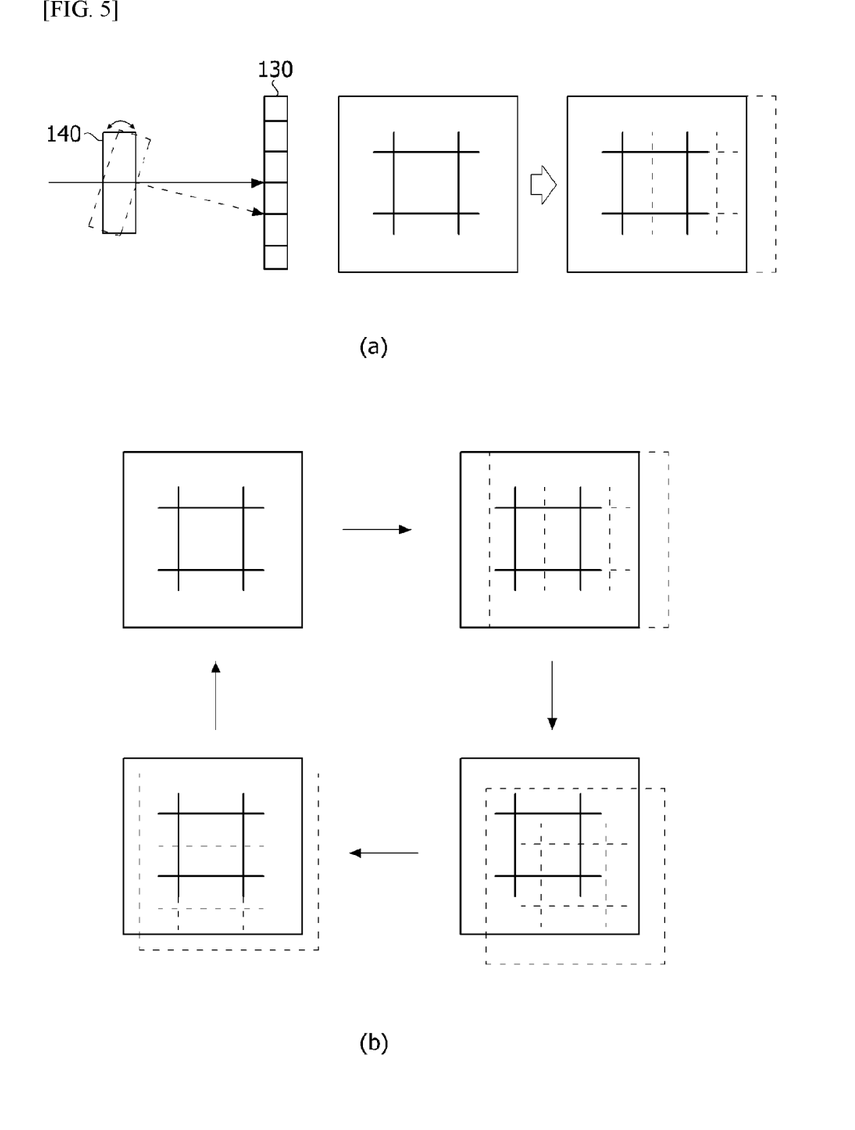
FIG. 5 is a set of diagrams illustrating a change in the optical path of a reflected light signal caused by a tilting unit.

FIG. 5 is a set of diagrams illustrating a change in the optical path of a reflected light signal caused by a tilting unit.

In FIG. 5A, portions indicated by solid lines represent a current optical path of a reflected light signal, and portions indicated by broken lines represent a changed optical path. When an integration time corresponding to the current optical path ends, the tilting unit may change the optical path of a reflected light signal as indicated by the broken lines. Then, the path of the reflected light signal is moved by a subpixel from the current optical path. For example, as shown in FIG. 5A, when the tilting unit 140 moves the current optical path to the right by 0.173 degrees, the reflected light signal which is incident on the image sensor unit 130 may be moved to the right by 0.5 pixels (a subpixel).

According to the embodiment of the present invention, the tilting unit 140 may change the optical path of a reflected light signal clockwise from a reference position. For example, as shown in FIG. 5B, the tilting unit 140 moves the optical path of the reflected light signal to the right by 0.5 pixels on the basis of the image sensor unit 130 during a second integration time after a first integration time ends. Then, the tilting unit 140 moves the optical path of the reflected light signal downward by 0.5 pixels on the basis of the image sensor unit 130 during a third integration time. Then, the tilting unit 140 moves the optical path of the reflected light signal to the left by 0.5 pixels on the basis of the image sensor unit 130 during a fourth integration time. Then, the tilting unit 140 moves the optical path of the reflected light signal upward by 0.5 pixels on the basis of the image sensor unit 130 during a fifth integration time. In other words, the tilting unit 140 may move the optical path of the reflected light signal to the reference position through four integration times. This may also be used in moving the optical path of an incident light signal in the same way, and thus the detailed description thereof is omitted. The clockwise change pattern of the optical path is only exemplary, and the change pattern of the optical path may be counterclockwise.

Meanwhile, a subpixel may be larger than zero pixels and smaller than one pixel. For example, a subpixel may have a size of 0.5 pixels or ⅓ pixels. The size of a subpixel is changeable in design by those of ordinary skill in the art.

The image control unit 150 extracts the depth information having a higher resolution than the subframe by rearranging the pixel values of the plurality of subframes generated from the electric signals.

As described above, an electric signal includes a phase difference between an incident light signal and a reflected light signal, and one subframe may be generated from one electric signal.

Figure 6:
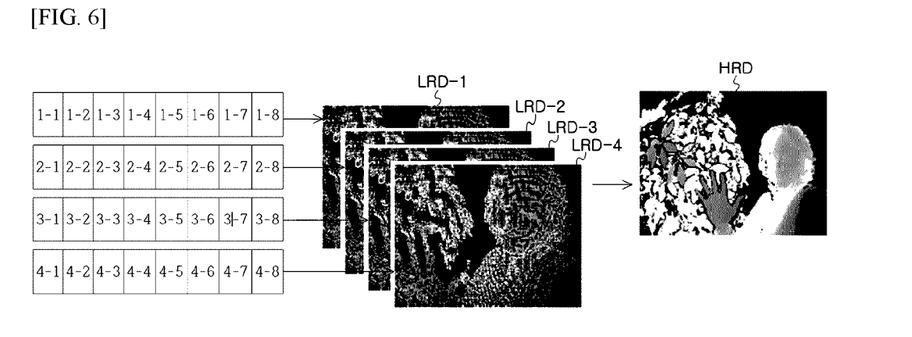
FIGS. 6 and 7 are diagrams illustrating a super resolution (SR) technique according to an embodiment of the present invention.
Figure 7:
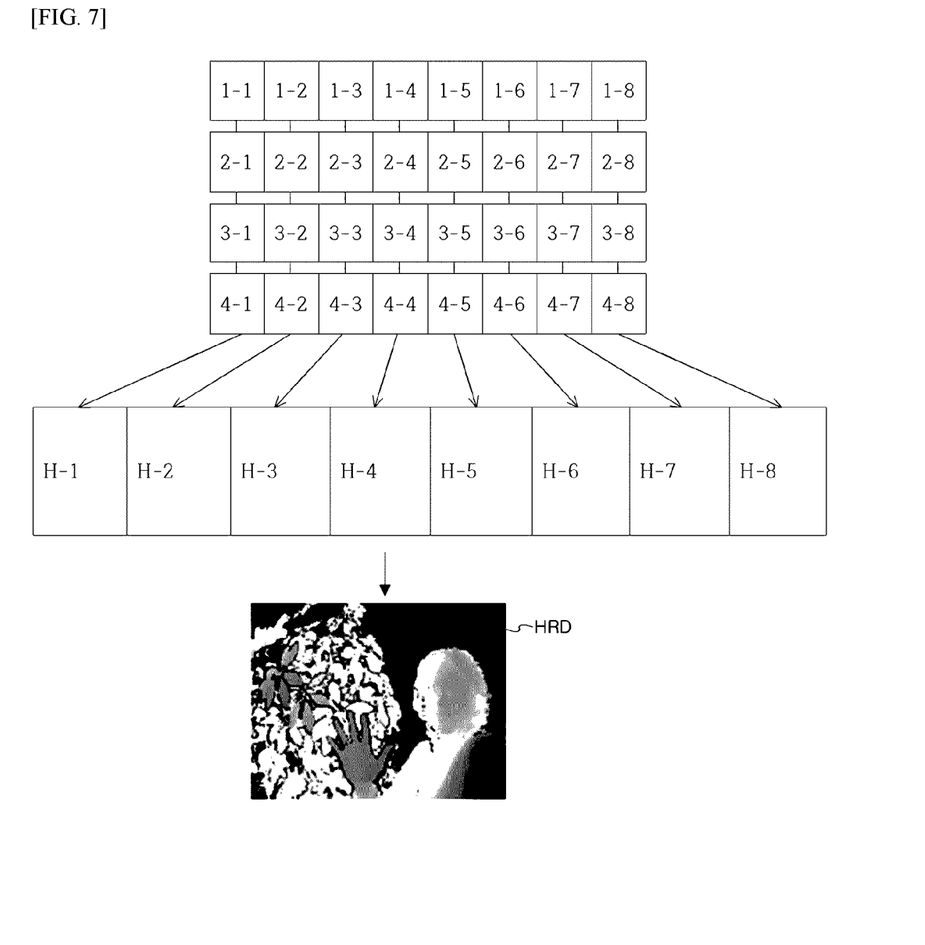

FIGS. 6 and 7 are diagrams illustrating the SR technique according to the embodiment of the present invention. The term "high resolution" used below has a relative meaning of a resolution higher than a low resolution.

Specifically, the image control unit 150 may extract a plurality of pieces of low-resolution depth information using a plurality of low-resolution subframes generated during the same integration time, that is, the same frame. Also, the image control unit 150 may extract a high-resolution depth image by rearranging the pixel values of the plurality of pieces of low-resolution depth information. Here, incident light signals or reflected light signals corresponding to the plurality of pieces of low-resolution depth information have different optical paths.

For example, in FIG. 6, the image control unit 150 generates low-resolution subframes 1-1 to 4-8 using a plurality of electric signals. The low-resolution subframes 1-1 to 1-8 are low-resolution subframes generated during a first integration time. The low-resolution subframes 2-1 to 2-8 are low-resolution subframes generated during a second integration time. The low-resolution subframes 3-1 to 3-8 are low-resolution subframes generated during a third integration time. The low-resolution subframes 4-1 to 4-8 are low-resolution subframes generated during a fourth integration time. The image control unit 150 extracts the pieces of low-resolution depth information LRD-1 to LRD-4 by applying a depth information extraction technique to a plurality of low-resolution subframes generated during each integration time. The low-resolution depth information LRD-1 is low-resolution depth information extracted using the subframes 1-1 to 1-8. The low-resolution depth information LRD-2 is low-resolution depth information extracted using the subframes 2-1 to 2-8. The low-resolution depth information LRD-3 is low-resolution depth information extracted using the subframes 3-1 to 3-8. The low-resolution depth information LRD-4 is low-resolution depth information extracted using the subframes 4-1 to 4-8. Then, the image control unit 150 extracts high-resolution depth information HRD by rearranging pixel values of the pieces of the low-resolution depth information LRD-1 to LRD-4.

Alternatively, the image control unit 150 may generate a high-resolution subframe by rearranging pixel values of a plurality of subframes corresponding to the same reference signals. In this case, incident light signals or reflected light signals corresponding to the plurality of subframes have different optical paths. Then, the image control unit 150 may extract high-resolution depth information using the plurality of high-resolution subframes.

For example, in FIG. 7, the image control unit 150 generates the low-resolution subframes 1-1 to 4-8 using a plurality of electric signals. The low-resolution subframes 1-1 to 1-8 are low-resolution subframes generated during a first integration time. The low-resolution subframes 2-1 to 2-8 are low-resolution subframes generated during a second integration time. The low-resolution subframes 3-1 to 3-8 are low-resolution subframes generated during a third integration time. The low-resolution subframes 4-1 to 4-8 are low-resolution subframes generated during a fourth integration time. Here, the low-resolution subframes 1-1, 2-1, 3-1, and 4-1 correspond to the same reference signal C1 but different optical paths. Then, the image control unit 150 may generate a high-resolution subframe H-1 by rearranging pixel values of the low-resolution subframes 1-1, 2-1, 3-1, and 4-1. When high-resolution subframes H-1 to H-8 are generated by rearranging pixel values, the image control unit may extract high-resolution depth information HRD by applying a depth information extraction technique to the high-resolution subframes H-1 to H-8.

Figure 8:
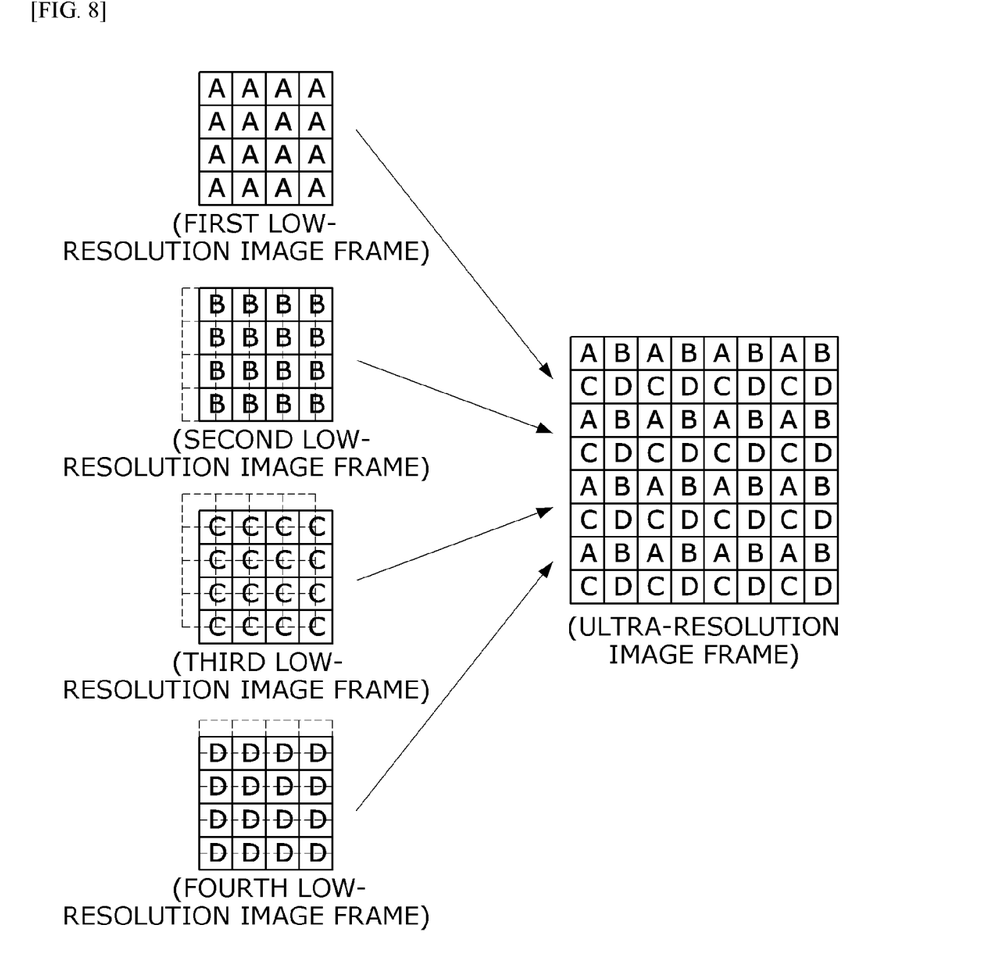
FIG. 8 is a set of diagrams illustrating a pixel value arrangement process of low-resolution image frames according to an embodiment of the present invention.

The SR technique according to an embodiment of the present invention will be described below. FIG. 8 is a set of diagrams illustrating a pixel value arrangement process of low-resolution image frames according to an embodiment of the present invention. As described above, unlike the existing SR technique employing an inverse function, the SR technique according to the embodiment of the present invention generates a high-resolution frame by rearranging pixel values of a plurality of low-resolution frames.

According to the embodiment of the present invention, the image control unit 150 generates a high-resolution image frame by rearranging pixel values of a plurality of low-resolution subframes or a plurality of pieces of low-resolution depth information corresponding to different optical paths in a high-resolution pixel grid. In this case, the image control unit 150 may arrange pixel values according to a shift direction of an optical path corresponding to each low-resolution image frame.

In FIG. 8, it is assumed that four low-resolution images of 4×4 size are used to generate one high-resolution image of 8×8 size. In this case, a high-resolution pixel grid has 8×8 pixels which are the same as pixels of the high-resolution image. Here, a low-resolution image may have a meaning encompassing a low-resolution subframe and low-resolution depth information, and a high-resolution image may have a meaning encompassing a high-resolution subframe and high-resolution depth information.

In FIG. 8, first to fourth low-resolution images are low-resolution images captured by moving an optical path by as much as a subpixel which has the size of 0.5 pixels. The image control unit 150 arranges pixel values of the second to fourth low-resolution images in the high-resolution pixel grid corresponding to the high-resolution image according to a direction in which the optical path is moved on the basis of the first low-resolution image in which the optical path is not moved.

Specifically, the second low-resolution image is an image obtained by moving the first low-resolution image to the right by as much as the subpixel. Accordingly, pixels B of the second low-resolution image frame are each disposed to the right of pixels A of the first low-resolution image.

The third low-resolution image is an image obtained by moving the second low-resolution image downward by as much as the subpixel. Accordingly, pixels C of the third low-resolution image are each disposed downward from one of the pixels B of the second low-resolution image.

The fourth low-resolution image is an image obtained by moving the third low-resolution image to the left by as much as the subpixel. Accordingly, pixels D of the fourth low-resolution image are each disposed to the left of the pixels C of the third low-resolution image.

When all pixel values of the first to fourth low-resolution images are rearranged in the high-resolution pixel grid, a high-resolution image frame is generated with a resolution which is four times that of the low-resolution images.

Meanwhile, the image control unit 150 may apply a weight to values of the disposed pixels. The weight may vary according to the size of a subpixel or a shift direction of an optical path and may vary according to each low-resolution image.

Figure 9:
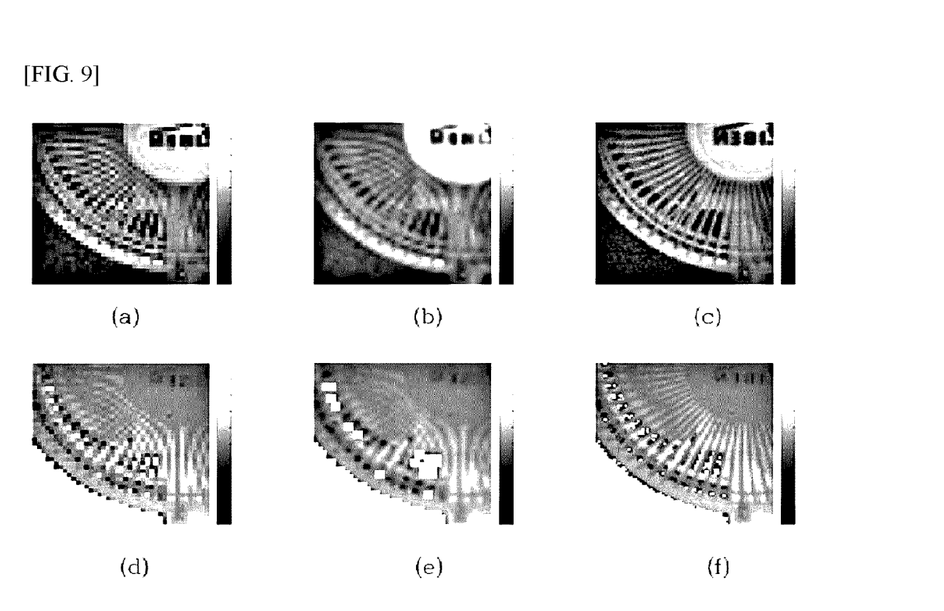
FIG. 9 is a set of diagrams showing simulation results according to an embodiment of the present invention.

FIG. 9 is a set of diagrams showing simulation results according to an embodiment of the present invention.

FIG. 9A to 9C show IR image measurement results. FIG. 9A shows a low-resolution IR image with a resolution of 41×41. FIG. 9B shows a high-resolution IR image with a resolution of 81×81 obtained by applying interpolation to the low-resolution IR image of FIG. 9A. FIG. 9C shows a high-resolution IR image obtained by applying the SR technique (pixel rearrangement) according to the embodiment of the present invention to four low-resolution IR images with a resolution of 41×41. FIG. 9B is smoother than FIG. 9A with an increase in resolution, but sharpness of the image is not significantly improved. However, the high-resolution IR image of FIG. 9C is significantly improved in sharpness in comparison with FIG. 9A or 9B.

FIGS. 9D to 9F show depth information extraction results. FIG. 9D shows low-resolution depth information with a resolution of 41×41. FIG. 9E shows high-resolution depth information with a resolution of 81×81 extracted by applying interpolation to the low-resolution depth information of FIG. 9D. FIG. 9F shows high-resolution depth information extracted by applying the SR technique (pixel rearrangement) according to the embodiment of the present invention to four pieces of low-resolution depth information with a resolution of 41×41. FIG. 9E is smoother than FIG. 9D with an increase in resolution, but sharpness of the image is not significantly improved. However, the high-resolution depth information of FIG. 9F is significantly improved in sharpness in comparison with FIG. 9D or 9E.

Although the present invention has been described above with reference to the embodiments, the embodiments are only exemplary and do not limit the present invention. Those of ordinary skill in the art should appreciate that various modifications and applications without departing from the essential characteristics of the embodiments. For example, each element specified in the embodiments may be implemented in a modified form. Further, differences related to such modifications and applications should be construed as being included in the scope of the present invention as defined by the appended claims.

The invention claimed is:

1. A camera module comprising:
a lighting unit configured to output an incident light signal to be emitted to an object, the incident light signal being a pulse wave or a continuous wave;
a lens unit configured to concentrate a reflected light signal reflected from the object;
an image sensor unit configured to generate electric signals from the reflected light signal concentrated by the lens unit, the image sensor unit including a plurality of pixels, each of the plurality of pixels including a first light-receiving subpixel and a second light-receiving subpixel;
a tilting unit configured to shift an optical path of the reflected light signal by a distance corresponding to ⅓ of a length of a pixel among the plurality of pixels to 0.5 of the length of the pixel for a plurality of subframe images generated during one frame; and
an image control unit configured to extract depth information of the object using a phase difference between the incident light signal and the reflected light signal,
wherein the image control unit comprises an image controller configured to extract the depth information having a higher resolution than each of the plurality of subframe images, the depth information having the higher resolution being based on the plurality of subframe images,
wherein the incident light signal is not a structured light signal, and
wherein the first light-receiving subpixel is turned on and absorbs the reflected light signal in a phase identical to a phase of the incident light signal while the second light-receiving subpixel is turned off, and the second light-receiving subpixel is turned on and absorbs the reflected light signal in a phase opposite to the phase of the incident light signal while the first light-receiving subpixel is turned off.

2. The camera module of claim 1, wherein the image control unit generates a high-resolution subframe image having a higher resolution than the plurality of subframe images, which correspond to reference signals having a same phase and different optical paths, by rearranging pixel values of the plurality of subframe images.

3. The camera module of claim 2, wherein the image control unit generates a plurality of high-resolution subframe images corresponding to reference signals having different phases and extracts the depth information using the plurality of high-resolution subframes.

4. The camera module of claim 3, wherein the image control unit rearranges the pixel values of the plurality of subframe images in a high-resolution pixel grid in a direction in which the optical path is shifted based on a subframe image that has an optical path that is identical to a preset reference path among the plurality of subframes.

5. The camera module of claim 4, wherein the image control unit rearranges the pixel values of the plurality of subframe images in the high-resolution pixel grid by applying weights to the pixel values of the plurality of subframe images.

6. The camera module of claim 5, wherein the weights are set differently depending on a size of the subpixels or the direction in which the optical path is shifted.

7. The camera module of claim 1, wherein the image control unit generates low-resolution depth information having a same resolution as the plurality of subframe images, which correspond to reference signals having a same phase and a same optical path, based on the plurality of subframe images.

8. The camera module of claim 7, wherein the image control unit generates a plurality of pieces of low-resolution depth information corresponding to different optical paths and extracts the depth information using the plurality of pieces of low-resolution depth information.

9. The camera module of claim 8, wherein the image control unit rearranges pixel values of the plurality of pieces of low-resolution depth information in a high-resolution pixel grid according to a direction in which the optical path is shifted based on low-resolution depth information corresponding to an optical path that is identical to a preset reference path among the plurality of pieces of low-resolution depth information.

10. The camera module of claim 9, wherein the image control unit rearranges the pixel values of the plurality of pieces of low-resolution depth information in the high-resolution pixel grid by applying weights to the pixel values of the plurality of pieces of low-resolution depth information.

* * * * *